(12) United States Patent
McClure

(10) Patent No.: US 8,773,659 B2
(45) Date of Patent: Jul. 8, 2014

(54) ANASTIGMATIC IMAGING SPECTROGRAPH

(75) Inventor: Jason McClure, Leominster, MA (US)

(73) Assignee: Roper Scientific Inc., Tucson, AZ (US)

( * ) Notice: Subject to any disclaimer, the term of this patent is extended or adjusted under 35 U.S.C. 154(b) by 101 days.

(21) Appl. No.: 13/350,060

(22) Filed: Jan. 13, 2012

(65) Prior Publication Data
US 2013/0182250 A1    Jul. 18, 2013

(51) Int. Cl.
*G01J 3/28*    (2006.01)

(52) U.S. Cl.
USPC ............................ 356/302; 356/305; 356/326

(58) Field of Classification Search
USPC .................. 356/302, 305, 326–330
See application file for complete search history.

(56) References Cited

U.S. PATENT DOCUMENTS

| | | | |
|---|---|---|---|
| 3,628,849 A | 12/1971 | Flamand et al. | |
| 4,820,048 A * | 4/1989 | Barnard | 356/328 |
| 5,192,981 A | 3/1993 | Slutter et al. | |
| 5,327,291 A * | 7/1994 | Baker et al. | 359/716 |
| 5,565,983 A * | 10/1996 | Barnard | 356/328 |
| 5,650,877 A * | 7/1997 | Phillips et al. | 359/726 |
| 5,880,834 A * | 3/1999 | Chrisp | 356/328 |
| 7,345,760 B2 | 3/2008 | Deck | |
| 7,812,949 B2 | 10/2010 | Delmas et al. | |
| 2002/0016629 A1 | 2/2002 | Sandstedt et al. | |
| 2002/0176077 A1 | 11/2002 | Caruso et al. | |
| 2005/0018187 A1 | 1/2005 | Slutter et al. | |
| 2007/0165224 A1 | 7/2007 | Deck | |
| 2008/0204711 A1 | 8/2008 | Harrison et al. | |
| 2008/0252956 A1 * | 10/2008 | Broome et al. | 359/216 |
| 2009/0103088 A1 * | 4/2009 | Delmas et al. | 356/328 |
| 2010/0309454 A1 | 12/2010 | Zhang | |

FOREIGN PATENT DOCUMENTS

EP    2051050 A2    4/2009

OTHER PUBLICATIONS

International Search Report for PCT/US 13/20637 mailed Apr. 11, 2013.

* cited by examiner

*Primary Examiner* — Gregory J Toatley
*Assistant Examiner* — Dominic J Bologna
(74) *Attorney, Agent, or Firm* — Caesar, Rivise, Bernstein, Cohen & Pokotilow, Ltd.

(57) ABSTRACT

An apparatus and method are disclosed for producing spectrographic images free of SI, SII, and SIII field aberrations. The apparatus includes a focusing element placed at a distance from a dispersing element equal to the radius of curvature of the focusing element. The apparatus further includes at least one correcting plate for adding or subtracting abberations.

15 Claims, 5 Drawing Sheets

ANASTIGMATIC IMAGING SPECTROGRAPH

FIELD OF THE INVENTION

The present invention relates to spectrographs and, more particularly to an improved spectrograph that is designed to correct for spherical, coma, and astigmatism aberration in a dispersed light beam that is imaged onto a focal plane array detector.

BACKGROUND OF THE INVENTION

A spectrograph is an optical instrument used to disperse and sharply focus light in the plane of dispersion, typically the horizontal or tangential plane of the instrument, onto a focal plane array detector. For further clarification, the tangential plane herein refers to the plane parallel to the page. Spectrographs are typically used to investigate specific material properties through light's various interactions with matter. Several examples include, though not limited to, Raman scattering, fluorescence emission/excitation spectroscopy, Rayleigh scattering, etc. . . . Modern commercial spectrographs typically combine one or more curved optical elements, either reflective mirrors or refractive lenses, which collimate light to and focus dispersed light from a dispersive element, such as a diffraction grating or prism. Light consisting of a plurality of dispersed wavelengths is focused onto a focal plane array detector, such as a charge coupled device (CCD) or photo diode array (PDA).

Typical commercial spectrographs employ the Czerny-Turner type optical design or variants thereof. In this design, two mirrors are used with off-axis chief rays with a dispersive element placed near their midpoint to form a 'W' shape. More specifically, the two mirrors are located at the bottom apexes of the W and the grating at the top apex. The first mirror, typically a toroid in shape, collimates light from a source point located at the entrance slit of the spectrograph. The source point may be a fiber optic, multiple fiber optics placed at the slit plane, or an image projected from any optical instrument. A dispersive element, usually a diffraction grating, is arranged to receive collimated light from the first mirror and disperse collimated light towards the second mirror. The second mirror, typically spherical in shape, focuses spectrally dispersed images of the source point with residual aberrations onto a focal plane array detector. These residual image aberrations are inherent in typical Czerny-Turner designs and are a defining characteristic of the instrument.

The imaging performance of a Czerny-Turner spectrograph correlates to how well it will resolve dispersed spectral features and the extent to which source points located vertically along the slit plane may be spatially resolved. Spatial resolution along the slit plane is of paramount importance for multi-channel spectroscopy or hyper-spectral imaging techniques. The three primary third order 'Seidel' aberrations that limit imaging performance that concern one designing a spectrograph, listed here by their Seidel coefficient, are spherical (SI), coma (SII), and astigmatism (SIII). Of these three aberrations, coma and astigmatism are the most critical to the designer because they asymmetrically distort recorded spectral features and affect both dispersive and spatial resolution. Spherical aberration, or SI, is less concerning because it symmetrically broadens line profiles resulting in diminished peak intensity in a spectral feature.

Uncorrected SI in a typical Czerny-Turner spectrograph is observed as a diffuse symmetric blur about the image of a source point and is known to increase in severity as $1/(f/\#)^3$.

As used herein, f/# or 'f number', refers to the ratio of a mirror or lens's effective focal length to the diameter of its entrance pupil. The f/# of a mirror also correlates to its light collecting power as $1/(f/\#)^2$. Therefore, the smaller the f/# of a spectrograph, the faster it will gather light and the more prone it becomes to suffering from debilitating image aberrations.

It is known historically from the Rayleigh Criterion that the wavefront aberration, WI, caused by SI alone should be made less than $\lambda/4$ to insure diffraction limited performance in an optical system. As used herein, WI is the wavefront aberration produced by SI and $\lambda$ a particular wavelength of light. For large aperture low f/# mirrors, for example, mirrors having an f/# lower than f/5 with diameters greater than 32 mm operating at a design wavelength $\lambda$ of 500 nm, will suffer noticeable WI and correction should be implemented into the optical design of the spectrograph.

Mathematically, the Seidel coefficient SI for a spherical mirror is listed as equation 1 where 'y' is the radial distance measured from the mirror apex out to the clear aperture edge and 'R' the radius of curvature. All subscripts refer to the respective mirror in question and the sum over all like Seidel coefficients gives the total respective aberration in the optical train comprising the spectrograph. The wavefront aberration associated with SI, labeled WI, is given by equation 2 where $y_m$ is the mirror's maximum clear aperture half-width. Because SI and WI respectively increase as the 4'th power in mirror half-width, WI rapidly becomes problematic for large aperture, low f/# optics.

$$(SI)_i = 2\frac{y_i^4}{R_i^2} \tag{1}$$

$$(WI)_i = \frac{1}{8}\left(\frac{y}{y_m}\right)^4 (SI)_i \tag{2}$$

Uncorrected SII is observed as the asymmetric broadening of the image of a source point primarily in the tangential or dispersion plane of the spectrograph. SII is caused by chief rays reflecting from a mirror rotated about its optical axis. In the case of the Czerny-Turner spectrograph, mirrors are rotated about the sagittal or vertical axis which predominantly adds positive or negative tangential SII into the image. Sagittal SII is present, however, to a much lesser extent and is of little concern. Mathematically, the SII coefficient for a spherical mirror is represented by equation 3 where $s_i$ is the distance along the principal ray traced from the mirror's vertex to the center of the system stop, i.e. the grating, and u the principal ray angle or the off-axis angle on the mirror.

$$(SII)_i = -2\left(\frac{y_i}{R_i}\right)^3 (R_i - s_i)\sin u_i \tag{3}$$

Uncorrected SIII is observed as the asymmetric broadening of the image of a source point in the sagittal or vertical plane when a detector is positioned for maximum resolution or tightest sagittal focus. SIII is the result of the tangential and sagittal focal planes for a concave mirror departing longitudinally from one another when arranged to image off-axis source points. SIII for all non-axial image points, or field points, is observed to increase rapidly in the typical Czerny-Turner spectrograph with increasing tangential image distance from the focal plane center. As used herein, the term 'field' refers to any image point or aberration of an image point formed a measurable distance from the center of the focal plane. The fluence in recorded spectral images then decreases for all field points because the image of the source point becomes vertically elongated covering more image sensing pixels. Mathematically, the SIII coefficient for a spherical mirror is defined as equation 4.

$$(SIII)_i = \left(\frac{y_i}{R_i}\right)^2 \frac{2}{R_i}[R_i(R_i - 2s_i) + s_i^2]\sin u_i^2 \quad (4)$$

In the typical Czerny-Turner spectrograph, methods for correcting for axial SII and SIII have been realized whereas correction for SI is typically absent and designers have historically followed the Rayleigh Criterion as a rough design guide. However, this rule warns against the use of low f/#, or fast optics, having long focal lengths. Because the dispersive resolution in a spectrograph is proportional to the focal length of its focusing mirror, a fast, high resolution instrument, absent of SI is not possible if using a conventional design.

It is known that axial SII can be entirely corrected at one grating angle by correct choice of mirror radii $R_i$ and off-axis angles $u_i$. This is evident from equation 3 for the sign of the off axis angle $u_i$ will reverse for the collimating and focusing mirrors in the conventional 'W' arrangement. Therefore, a condition can be met where the coma introduced by the first mirror is equal and opposite that of the second. However, the diffraction grating imparts anamorphic magnification into the dispersed beam which compresses or expands the beam and, most importantly, this anamorphic effect changes with grating angle. Therefore, the half-width of the beam illuminating the second mirror is a function of grating angle and so SII can only be corrected for a specific design grating angle or rather, design wavelength range.

SIII is typically corrected for axial image points only, that is, it only tends to zero at the center of the focal plane and field SIII is left uncorrected. It is known that axial SIII correction can be accomplished in several ways. The most common method for correcting axial SIII is the use of a toroidal collimating mirror which has a shorter radius of curvature in the sagittal plane than the tangential plane. The choice of optimum sagittal radius is determined by considering the total astigmatic focal shift imparted by the two concave mirrors used at their respective off-axis angles $u_i$. The total astigmatic focal shift for two concave mirrors each having one infinite conjugate plane and arranged in such a way as to image a source point located a distance $f_{r1}$ from the first mirror is given as equation 5a. Sagittal and tangential focal lengths, $f_s$ and $f_t$, are related to a mirror's sagittal and tangential radius of curvature $R_s$ and $R_t$, if toroidal, and are given by equations 5b and 5c. Numerical and index 'i' subscripts in equations 5a-5c refer to the first 'collimating' mirror and second 'focusing' mirror. Note that for a spherical mirror $R_s$ is equal to $R_t$, however, $f_s$ and $f_t$ are not equal due to a non-zero off-axis angle u. The sagittal radius on the collimating mirror $R_{s1}$ may be determined according to equation 5a for zero astigmatic focal shift. That is, $\Delta f_{SIII}=0$. This method will remove axial astigmatism from the final image.

$$\Delta f_{SIII} = (f_{s1} - f_{t1}) + (f_{s2} - f_{t2}) \quad (5a)$$

$$f_{s_i} = \frac{R_{s_i}}{2\cos u_i} \quad (5b)$$

$$f_{t_i} = \frac{R_{t_i}}{2}\cos u_i \quad (5c)$$

In place of a toroidal collimating mirror, the grating, having uniform groove spacing, may itself be toroidal in shape so as to provide the necessary condition for axial SIII correction per equation 5a. In this configuration, the toroidal grating takes the place of the collimating mirror and provides axial SIII correction at one wavelength or more precisely at one grating angle. As the grating is rotated from the ideal angle, so as to change the observed wavelength range spanned by the focal plane array detector, correction for axial SIII will suffer.

A third method for correcting axial SIII includes using an aberration corrected holographic grating having variable line spacing. Such gratings can completely correct for axial SIII at one wavelength and moderately suppress axial SIII at other wavelengths. (U.S. Pat. No. 3,628,849) All references cited herein are incorporated by reference as if fully set forth herein.

Uncorrected field SIII in a spectrograph is highly detrimental when spatial resolution for source points located vertically along the entrance slit is desired. For example, if multiple fiber optic sources from a linear fiber bundle are placed at the slit plane, uncorrected field SIII will result in dispersed light from adjacent fiber optic sources to overlap or 'cross-talk' at the edges of the focal plane. This ultimately reduces the number of fiber optic sources or discrete optical channels an imaging spectrograph can accommodate before cross-talk occurs. Additionally, in the case where an image projected from a microscope or any other image forming instrument is incident at the entrance slit plane of the spectrograph, uncorrected SIII will result in the inability to resolve spatial image information for field points in the sagittal plane.

It is therefore desirable to provide a high resolution imaging spectrograph that operates at low f/# and which provides anastigmatic imaging over the entire field of a flat focal plane array detector at its design wavelength and remains nearly anastigmatic for wavelengths departing from its design wavelength.

SUMMARY OF THE INVENTION

According to one embodiment of the invention, there is provided a spectrograph comprising a collimating element that receives an incoming beam of light from a source point, a dispersive element that receives light from the collimating element arranged to disperse collimated light in the tangential plane, an aspheric corrector plate that receives light from the dispersive element, an aspheric concave focusing element arranged to focus dispersed light from the corrector plate along the length of an elongated focal plane array detector, wherein the corrector plate adds and/or subtracts certain amounts of SI, SII and SIII from the dispersed light beam, the concave aspheric focusing element arranged to be a precise distance from the dispersive element so as not to introduce additional field SIII and its aspheric surface designed to balance residual SI, SII, and SIII field aberrations.

According to another embodiment of the invention, there is provided a spectrograph comprising a first aberration correcting plate that receives an incoming beam of light from a source point, a collimating element that receives light from a first aberration correcting plate, a dispersive element that receives light from the collimating element arranged to disperse collimated light in the tangential plane, a second aspheric corrector plate that receives light from the dispersive element, an aspheric concave focusing element arranged to focus dispersed light from the dispersive element along the length of an elongated focal plane array detector, wherein a first corrector plate adds and/or subtracts certain amounts of SI, SII and SIII from the input divergent light beam, a second corrector plate adds and/or subtracts further amounts of SI, SII and SIII from the dispersed light beam, the concave aspheric focusing element arranged to be a precise distance from the dispersive element so as not to introduce additional field SIII and its aspheric surface designed to balance residual SI, SII, and SIII field aberrations.

According to yet another embodiment of the invention, there is provided a spectrograph comprising a concave dispersive element that receives an incoming beam of light from a source point arranged to disperse and collimate light in the tangential plane, an aspheric corrector plate that receives light from the dispersive element, an aspheric concave focusing element arranged to focus dispersed light from the corrector plate along the length of an elongated focal plane array detector, wherein the corrector plate adds and/or subtracts certain amounts of SI, SII and SIII from the dispersed light beam, the concave aspheric focusing element arranged to be a precise distance from the dispersive element so as not to introduce additional field SIII and its aspheric surface designed to balance residual SI, SII, and SIII field aberrations.

According to yet another embodiment of the invention, there is provided a spectrograph comprising an aberration correcting plate that receives an incoming beam of light from a source point, a collimating element that receives light from an aberration correcting plate, a dispersive element that receives light from the collimating element arranged to disperse collimated light in the tangential plane, an aspheric concave focusing element arranged to focus dispersed light from the dispersive element along the length of an elongated focal plane array detector, wherein the corrector plate adds and/or subtracts certain amounts of SI, SII and SIII from the input divergent light beam, the concave aspheric focusing element arranged to be a precise distance from the dispersive element so as not to introduce additional field SIII and its aspheric surface designed to balance residual SI, SII, and SIII field aberrations.

In a further embodiment, there is disclosed a spectrograph for converting an incoming beam of light into a dispersed beam of light. The spectrograph includes an optical element for collimating the incoming beam of light into a collimated beam of light, a dispersing element for converting the collimated beam of light into a dispersed beam of light having a plurality of wavelengths; a focusing element to focus the dispersed beam of light onto a focal plane; and an aberration correcting element. The focusing element is positioned a distance equal to its radius of curvature from the dispersing element; and the focusing element comprises an aspheric departure from a concave surface, with the aspheric departure being adapted to add or subtract aberrations. The aberration correcting element is in an optical path between the incoming beam of light and the focusing element. In a further embodiment, there is included a second aberration correcting element.

In a further embodiment, the dispersing element is located on a surface of the collimating element to form a dispersing and collimating element. In a further embodiment, the incoming beam of light is first directed to the combined dispersing and collimating element to form collimated and dispersed beams of light and the collimated and dispersed beams of light are then directed to the first aberration correcting element and then to the focusing element.

In a further embodiment, the incoming beam of light is first directed to the first aberration correcting element and from the first aberration correcting element the beam is directed to said to the collimating element, with the collimated beam being directed to the dispersing element, from which the dispersed beams are directed to the focusing element.

In a further embodiment, the incoming beam of light is first directed to a second aberration correcting element and then to the collimating element. The collimated beam of light is then directed to the dispersing element. The dispersed beams of light are then directed to the first aberration correcting element and then to the focusing element.

In a further embodiment, there is disclosed a method of producing a spectrogram. The method includes the steps of directing a beam of light to at least one optical element for collimating and dispersing the beam of light to produce collimated dispersed beams of light; directing the collimated dispersed beams of light to at least a second optical element for correcting and focusing to produce a spectrographic image of the beam of light on a focal plane, wherein the focusing element is placed a distance equal to the radius of curvature of the focusing element from the dispersing element and wherein the correcting element includes an aspheric surface adapted to add or subtract aberrations.

BRIEF DESCRIPTION OF THE DRAWINGS

The accompanying drawings, which are incorporated herein and constitute a part of this specification, illustrate embodiments of the invention and together with the description server to explain the principals of the invention.

In the drawings.

DETAILED DESCRIPTION OF THE INVENTION

Figure 1:
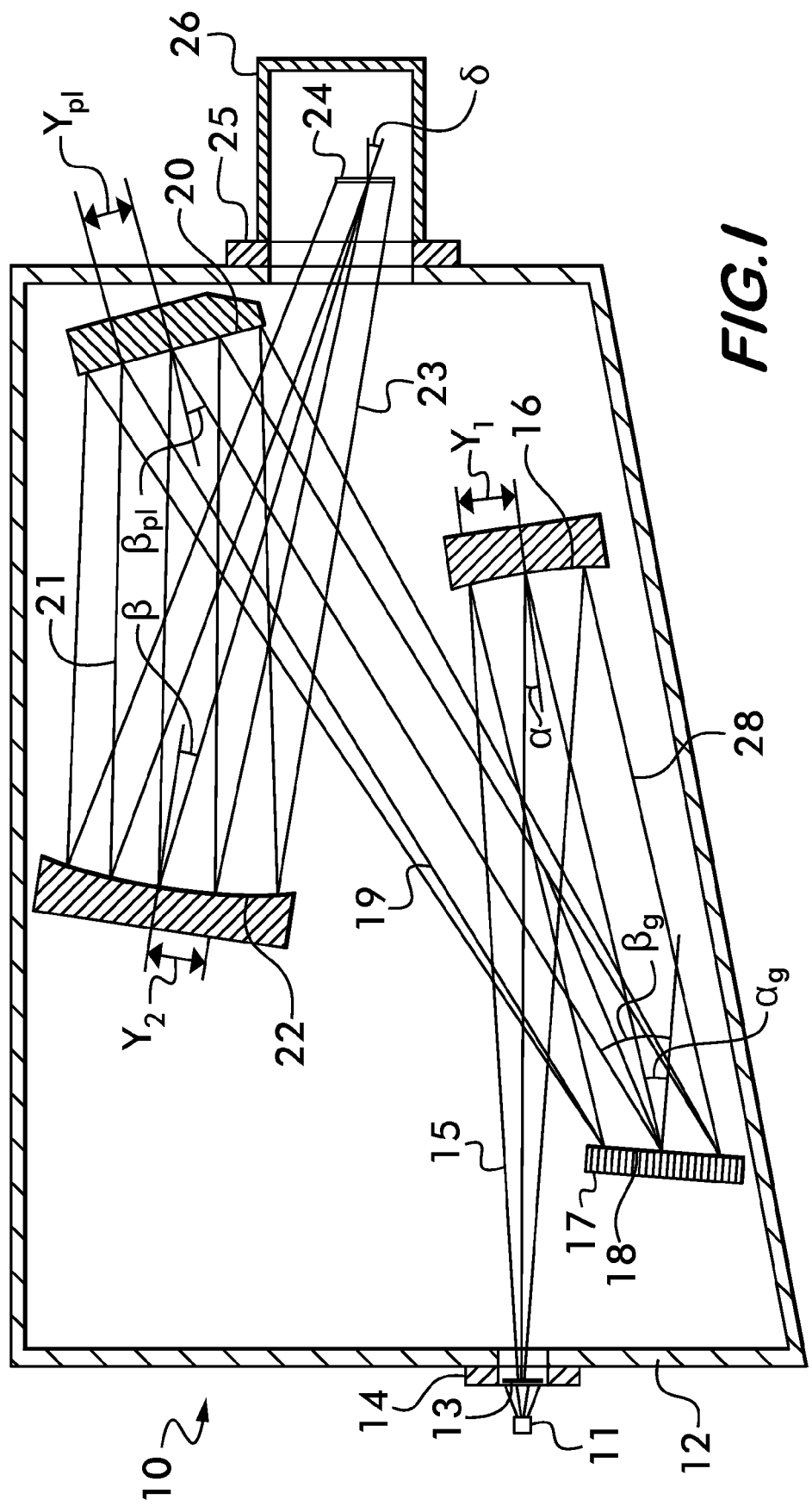
FIG. 1 is a diagrammatic view of a first embodiment of a spectrograph.

Referring initially to FIG. 1, one embodiment of a spectrograph is indicated generally by the reference numeral 10. The spectrograph 10 is used in the spectral analysis of light from a source point of light 11. The source point may consist of many source points located at the slit plane 13 and may be in the form of single or multiple fiber optic sources spatially separated vertically along the axis of the slit plane. In place of a physical light source placed at the slit plane, an image from a microscope or any imaging forming instrument may be projected onto the slit plane. The spectrograph includes a housing 12 with light entrance assembly 14 that may be in the form of a pair of entrance slits, an open aperture, or the end of a fiber optic bundle itself. Light from source point 11 enters the housing as a divergent entry beam 15 and propagates towards a concave toroidal shaped collimating mirror 16 having off axis angle $\alpha$, referring to FIG. 1. The collimating mirror 16 reflects light as a collimated beam 28 which is directed towards a diffraction grating 17. The collimated beam 28 now has certain amounts of $(SI)_1$, $(SII)_1$, and $(SIII)_1$ given respectively from equations 6a, 6b, and 6c within the approximation that the toroidal mirror is spherical having a radius equal to the design toroid's tangential radius. These aberrations will add algebraically to like aberrations as the light beam reflects from the remaining surfaces in spectrograph 10. Herein the subscript 1 on any Seidel coefficient refers to the collimating mirror 16.

$$(SI)_1 = 2\frac{y_1^4}{R_1^a} \tag{6a}$$

$$(SII)_1 = -2\left(\frac{y_1}{R_1}\right)^3 (R_1 - s_1)\sin\alpha \tag{6b}$$

$$(SIII)_1 = \left(\frac{y_1}{R_1}\right)^2 \frac{2}{R_1}[R_1(R_1 - 2s_1) + s_1^2]\sin^2\alpha \tag{6c}$$

The diffraction grating 17 has a plano surface having evenly spaced grooves 18 that are parallel to one another and the sagittal or vertical axis of the spectrograph. Collimated beam 28 strikes the grating with an angle of incidence (AOI) $\alpha_g$ and diffracted as dispersed beam 19, having angle of existence (AOE) $\beta_g$, refer to FIG. 1. Dispersed beam 19 is diffracted from the grating towards aspheric aberration corrector plate 20. Corrector plate 20 has a surface that is rotationally symmetric and a surface sag or departure from a plano surface that is given by equation 7, wherein the subscripts, pl, refer the corrector plate 20.

$$z_{pl} = a_{pl} y_{pl}^4 \tag{7}$$

The aspheric corrector plate 20 is arranged to accept light from the diffraction grating with an AOI given by $\beta_{pl}$ and introduces aberrations into reflected beam 21 that are given by the series of equations listed as equations 8a-8c where n and n' refer to the refractive index of the medium containing light paths 19 and 21 respectively, refer to FIG. 1. In the case that there is an air interface, n=−n'.

$$(SI)_{pl} = -\delta SI_{pl}^* \tag{8a}$$

$$(SII)_{pl} = \frac{s_{pl}}{y_{pl}} \delta SI_{pl}^* \sin\beta_{pl} \tag{8b}$$

$$(SIII)_{pl} = -\left(\frac{s_{pl}}{y_{pl}}\right)^2 \delta SI_{pl}^* \sin^2\beta_{pl} \tag{8c}$$

$$\delta SI_{pl}^* = 8(n - n') a_{pl} y_{pl}^4 \tag{8d}$$

Having only a 4'th ordered surface in radial coordinate y, corrector plate 20 if located at the system stop, i.e. $s_{pl}=0$, would introduce only pure SI in the form of $(SI)_{pl}$ given by equation 8a and 8d. However, because the corrector plate is shifted a distance $s_{pl}$ from the system stop, i.e. the grating, it will introduce $(SII)_{pl}$ and $(SIII)_{pl}$ given by equations 8b and 8c respectively.

Light path 21 is incident onto aspheric concave focusing mirror 22 at an AOI given by β, refer to FIG. 1. The surface sag on focusing mirror 22 is given by equation 9a where y is the radial distance measured from apex to edge and the mirror's curvature c being related to its radius of curvature R by equation 9b. The focusing mirror's surface can be understood as the algebraic sum of the surface sag from a typical spherical surface, first part of equation 9a, and an aspheric departure from that spherical surface given by the second part of equation 9a. The coefficient $a_2$ in 9a gives the amount of aspheric departure focusing mirror 22 will have.

$$z = \frac{c_2 y_2^2}{1 + \sqrt{1 - c_2^2 y_2^2}} + a_2 y_2^4 \tag{9a}$$

$$c_2 = 1/R_2 \tag{9b}$$

Light path 21 is reflected as converging beam 23 at an AOE given by β having aberrations of the form $(SI)_2$, $(SII)_2$, and $(SIII)_2$ given respectively from equations 1, 3, and 4 where the subscript 2 on any Seidel coefficient herein refers to aspheric focusing mirror 22. Because mirror 22 is aspheric it will have additional aberration coefficients added from the presence of the aspheric contribution to its surface. The resultant Seidel aberration coefficients for mirror 22 are given as the series of equations 10a-10d.

$$(SI)_2 = 2\frac{y_2^4}{R_2^3} + \delta SI_2^* \tag{10a}$$

$$(SII)_2 = 2\left(\frac{y_2}{R_2}\right)^3 (R_2 - s_2)\sin\beta + \frac{s_2}{y_2}\delta SI_2^* \sin\beta \tag{10b}$$

$$(SIII)_2 = \left(\frac{y_2}{R_2}\right)^2 \frac{2}{R_2}[R_2(R_2 - 2s_2) + s_2^2]\sin^2\beta + \left(\frac{s_2}{y_2}\right)^2 \delta SI_2^* \sin^2\beta \tag{10c}$$

$$\delta SI_2^* = 8(n - n') a_2 y_2^4 \tag{10d}$$

After reflection from aspheric focusing mirror 22, convergent beam 23 forms anastigmatic images of dispersed source points 11 onto a focal plane array sensor 24. The focal plane array detector 24 may be situated at an angle given by δ and located inside a housing 26, referring to FIG. 1. For the purpose of this description, the term "anastigmatic" as used herein, refers to the condition of an optical system in which images are produced free from axial and field aberrations of the form given by SI, SII and SIII Seidel coefficients at the optimized design wavelength. That is, any source point located at the slit plane is imaged to the focal plane array detector 24 with negligible image aberration. The term "nearly anastigmatic" as used herein, refers to the increase in axial and field SII due to the rotation of the grating away from the design wavelength. It should be clear from equations 6 and 10 that difference in Seidel aberration coefficients between a spherical and aspheric mirror having only a 4'th order aspheric coefficient 'a' is the addition of pure third order spherical aberration δSI* to the wavefront which, in turn, produces additional SII and SIII in amounts proportional to the distance the mirror is shifted from the system stop 's'.

In the preceding discussion, individual Seidel aberration coefficients are derived for each respective mirror as though they were isolated optics in free space. This treatment is correct only under the strict condition that each optic is separated by a collimated beam, that is, there exists at least one infinite conjugate plane for each mirror. For the case of the corrector plate, both image and object conjugate planes are located at infinity. The resultant contribution of each type Seidel aberration in spectrograph 10 is given by the sum of the individual Seidel terms and is listed below as equations 11a-11c.

$$(SI)_{Total} = 2\frac{y_1^4}{R_1^B} - \delta SI_{pl}^* + 2\frac{y_2^4}{R_2^3} + \delta SI_2^* \tag{11a}$$

$$(SII)_{Total} = -2\left(\frac{y_1}{R_1}\right)^3(R_1-s_1)\sin\alpha + \quad (11b)$$
$$\frac{s_{pr}}{y_{pl}}\delta SI^*_{pl}\sin\beta_{pl} + 2\left(\frac{y_2}{R_2}\right)^3(R_2-s_2)\sin\beta + \frac{s_2}{y_2}\delta SI^*_2\sin\beta$$

$$(SIII)_{Total} = \quad (11c)$$
$$\left(\frac{y_1}{R_1}\right)^2\frac{2}{R_1}[R_1(R_1-2s_1)+s_1^2]\sin^2\alpha - \left(\frac{s_{pl}}{y_{pl}}\right)^2\delta SI^*_{pl}\sin^2\beta_{pl} +$$
$$\left(\frac{y_1}{R_2}\right)^2\frac{2}{R_2}[R_2(R_2-2s_2)+s_2^2]\sin^2\beta + \left(\frac{s_2}{y_2}\right)^2\delta SI^*_2\sin^2\beta$$

The present invention is predicated on minimizing the total of each type of Seidel aberration in spectrograph 10 given by the equations 11a-11c. In the forgoing discussion, the axial and field aberrations are treated independently because of their varied dependence on stop position. For the treatment of axial image aberrations of the SII type, the position of the stop, $s_i$, is treated as though it were at each mirror's surface in the spectrograph 10. That is to say, axial aberrations of any optical system have no bearing on where the system stop is located, only do the field aberrations. By setting $(SII)_{Total}$ and $s_i$ equal to zero in equation 11b, rearranging terms, and substituting for the beam compression ratio given as equation 12a, referring to FIG. 1, results in the well known $\cos^3$ relation for axial coma compensation given herein as 12b. This relationship is used to constrain the design of spectrograph 10 for axial SII correction at a given design wavelength.

$$y_1 = \frac{\cos\alpha\cos\beta_g}{\cos\beta\cos a_g}y_2 \quad (12a)$$

$$\frac{\cos^3\beta\cos^3\alpha_g}{\cos^3\alpha\cos^3\beta_g}\left(\frac{R_2}{R_1}\right)^2 = \frac{\sin\alpha}{\sin\beta} \quad (12b)$$

Axial SIII is correction is not considered though equation 11c, rather it is compensated for by altering the sagittal radius of the collimating mirror which brings the longitudinally separated tangential and sagittal foci together at the axial image point as given by equations 5a-5c. The amount of longitudinal separation between sagittal and tangential foci is only dependant on the radii of the collimating and focusing mirrors and AOI of the principal rays. Light is incident on the collimating mirror at a fixed AOI, however, the diffraction grating disperses light into a plurality of wavelengths each leaving the grating at differing angles about $\beta_g$, referring to FIG. 1. Therefore, light at each respective wavelength is incident on the focusing mirror with principal ray angels that deviate from the axial ray angle $\beta$. This causes SIII to increase in extent at wavelengths that differ from the central wavelength and is the root cause of field SIII aberration in the typical Czerny-Turner spectrograph.

Field SIII is corrected in spectrograph 10 by forcing $(SIII)_1$ in equation 11c to zero by correct choice of sagittal radius on toroidal mirror 16 and by requiring the principal ray angle in the tangential plane for all source points located at the slit plane to be equal. That is to say, because mirror 16 has its sagittal radius chosen to balance $(SIII)_1$ for a specific and constant design principal ray angle of $\alpha$, refer to FIG. 1, field $(SIII)_1$ is by definition equal to zero. Field $(SIII)_2$ from the spherical contribution of focusing mirror 22 is made exactly zero by setting the stop distance equal to the mirror's radius of curvature, $s_2=R_2$, refer to FIG. 1. This leaves only the aspheric contributions from the corrector plate 20 and focusing mirror 22, given as equation 13c, remaining as a contributing terms to the total field SIII aberration in spectrograph 10.

$$(SI)_{Total} = 2\frac{y_1^4}{R_1^3} - \delta SI^*_{pl} + 2\frac{y_2^4}{R_2^3} + \delta SI^*_2 \quad (13a)$$

$$(SII)_{Total} = -2\left(\frac{y_1}{R_1}\right)^3(R_1-s_1)\sin\alpha - \frac{s_{pr}}{y_{pl}}\delta SI^*_{pl}\sin\beta_{pl} + \frac{s_2}{y_2}\delta SI^*_2\sin\beta \quad (13b)$$

$$(SIII)_{Total} = -\left(\frac{s_{pl}}{y_{pl}}\right)^2\delta SI^*_{pl}\sin^2\beta_{pl} + \left(\frac{s_2}{y_2}\right)^2\delta SI^*_2\sin^2\beta \quad (13c)$$

Equations 13a-13c detail the residual field aberrations remaining in spectrograph 10 which are minimized using a non-linear least square equation solver where the aspheric coefficients $a_{pl}$ and $a_2$ are set as variables, refer to equations 8d and 10d. The equations for axial SII and SIII correction per equations 5 and 12 respectively are used to further constrain the refinement. Once approximate design parameters are determined, a ray tracing program, such as ZEMAX optical system design software, is used to further optimize the design. ZEMAX is a trade mark of the Zemax Development Corporation, Bellevue, Wash. 98004, USA.

Figure 2:
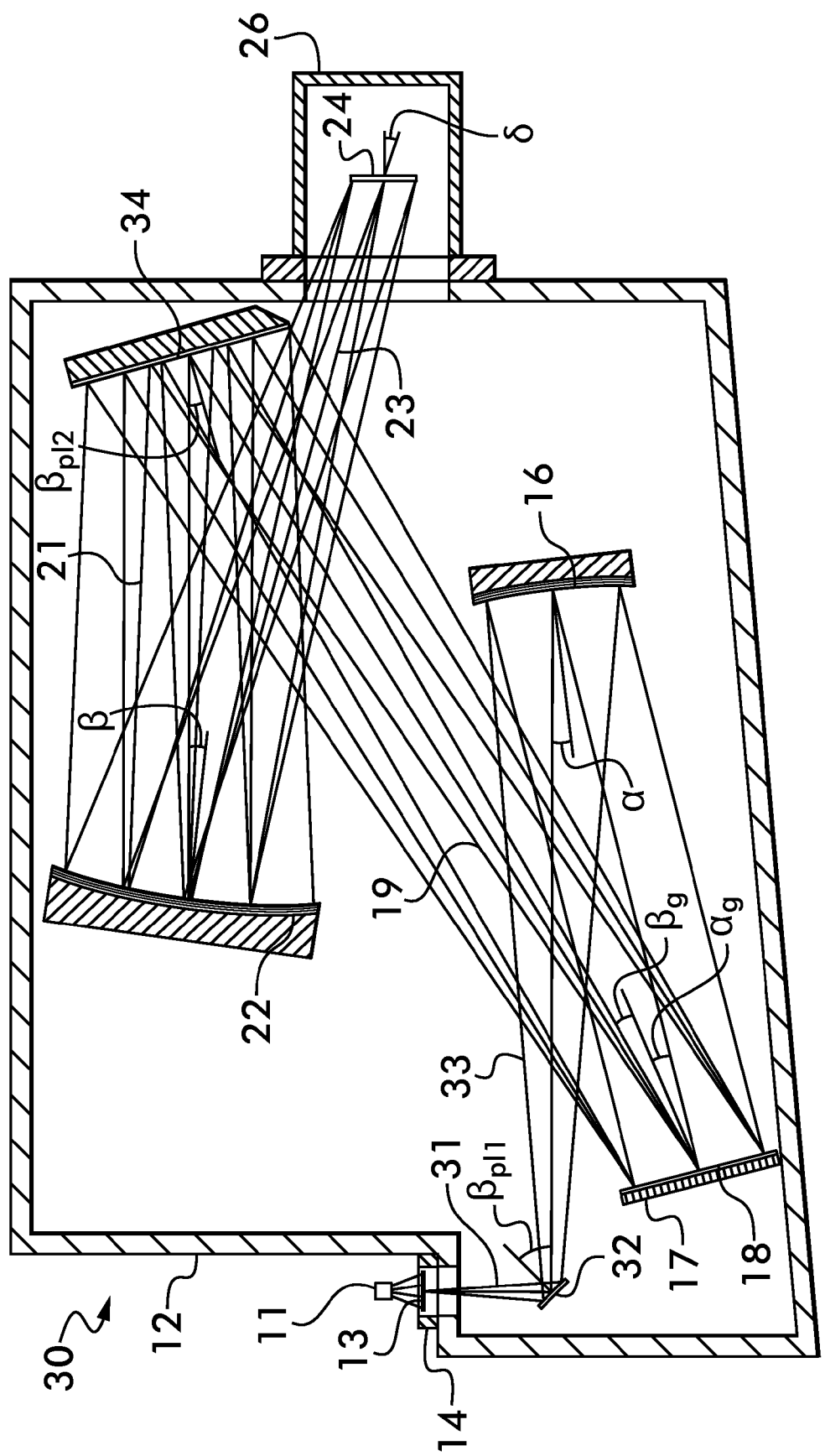
FIG. 2 is a diagrammatic view of a second embodiment of a spectrograph.

Referring to FIG. 2, a second embodiment of a spectrograph is indicated generally by the reference numeral 30. The spectrograph 30 is used in the spectral analysis of light from a source point of light 11. The source point may consist of many source points located at the slit plane 13 and may be in the form of single or multiple fiber optic sources spatially separated vertically along the axis of the slit plane. In place of a physical light source placed at the slit plane, an image from a microscope or any imaging forming instrument may be projected onto the slit plane. The spectrograph includes a housing 12 with light entrance assembly 14 that may be in the form of a pair of entrance slits, an open aperture, or the end of a fiber optic bundle itself. Light from source point 11 enters the housing as a divergent entry beam 31 and propagates towards a first aspheric aberration corrector plate 32. Corrector plate 32 has a surface that is rotationally symmetric and a surface sag or departure from a plano surface that is given by equation 14, wherein the subscripts, pl1, refer the first corrector plate 32.

$$z_{pl1} = a_{pl1}y_{pl1}^4 \quad (14)$$

The aspheric corrector plate 32 is arranged to direct light towards collimating mirror 16 and introduces aberrations into reflected beam 33 that are given identically by the series of equations listed as equations 8a-8c with the exception that the stop distance $s_{pl1}$ and aspheric coefficient $a_{pl1}$ are unique to corrector plate 32. The stop distance $s_{pl1}$ for a corrector plate located in a divergent beam is given by its virtual image distance as seen by the collimating mirror 16. This is given below as equation 15 where $f_1$ and g are the effective focal length of mirror 16 and the distance from light entrance assembly 14 to corrector plate 32 respectively.

$$s_{pl1} = f_1\frac{(f_1-g)}{g} \quad (15)$$

Light reflected from corrector plate 32 is directed towards concave toroidal shaped collimating mirror 16 having off axis angle $\alpha$, referring to FIG. 2. The collimating mirror 16 reflects light as a collimated beam 28 which is directed towards a diffraction grating 17. The collimated beam 28 has certain amounts of $(SI)_1$, $(SII)_1$, and $(SIII)_1$ given respectively and identically from equations 6a, 6b, and 6c within the approximation that the toroidal mirror is spherical having a radius equal to the design toroid's tangential radius. These aberrations will add algebraically to like aberrations as the light beam reflects from the remaining surfaces in spectrograph 30.

The diffraction grating 17 has a plano surface having evenly spaced grooves 18 that are parallel to one another and the sagittal or vertical axis of the spectrograph. Collimated beam 28 strikes the grating with an angle of incidence (AOI) $\alpha_g$ and diffracted as dispersed beam 19, having angle of existence (AOE) $\beta_g$, refer to FIG. 2. Dispersed beam 19 is diffracted from the grating towards a second aspheric aberration corrector plate 34. Corrector plate 34 has a surface that is rotationally symmetric and a surface sag or departure from a plano surface that is given by equation 16, wherein the subscripts, pl2, refer to the second corrector plate 34.

$$z_{pl2} = a_{pl2} y_{pl2}^4 \quad (16)$$

The second aspheric corrector plate 34 is arranged to accept light from the diffraction grating 17 with an AOI given by $\beta_{pl}$, referring to FIG. 2, and introduces aberrations into reflected beam 21 that are given identically by the series of equations listed as equations 8a-8c with exception that the stop distance $s_{pl2}$ and aspheric coefficient $a_{pl2}$ are unique to corrector plate 34. Light path 21 is incident onto aspheric concave focusing mirror 22 at an AOI given by $\beta$, refer to FIG. 2. The surface sag on focusing mirror 22 is given by identically equation 9a where y is the radial distance measured from apex to edge and the mirror's curvature c being related to its radius of curvature R by equation 9b. The coefficient $a_2$ in 9a gives the amount of aspheric departure focusing mirror 22 will have.

After reflection from aspheric focusing mirror 22, convergent beam 23 forms anastigmatic images of dispersed source points 11 onto a focal plane array sensor 24. The focal plane array detector 24 may be situated at an angle given by $\delta$ and located inside a housing 26, referring to FIG. 2. For the purpose of this description, the term "anastigmatic" refers to the condition of an optical system in which images are produced free from axial and field aberrations of the form given by SI, SII and SIII Seidel coefficients at the optimized design wavelength. That is, any source point located at the slit plane is imaged to the focal plane array detector 24 with negligible image aberration.

In the embodiment shown in FIG. 2, the total contribution of each type Seidel aberration is given in the same spirit as described by equations 11a-11c. Axial SII correction is achieved in the same spirit as given by equations 12a and 12b. Axial SIII is compensated for by altering the sagittal radius of the collimating mirror which brings the longitudinally separated tangential and sagittal foci together at the axial image point as given by equations 5a-5c.

Field SIII is corrected in spectrograph 30 by forcing $(SIII)_1$ in equation 11c to zero by correct choice of sagittal radius on toroidal mirror 16 and by requiring the principal ray angle in the tangential plane for all source points located at the slit plane to be equal. That is to say, because mirror 16 has its sagittal radius chosen to balance $(SIII)_1$ for a specific and constant design principal ray angle of $\alpha$, refer to FIG. 2, field $(SIII)_1$ is by definition equal to zero. Field $(SIII)_2$ from the spherical contribution of focusing mirror 22 is made exactly zero by setting the stop distance equal to the mirror's radius of curvature, $s_2 = R_2$, refer to FIG. 2. This leaves only the aspheric contributions from the corrector plates 32, 34 and focusing mirror 22, remaining as a contributing terms to the total field SIII aberration in spectrograph 30.

A series of equations similar in spirit to equations 13a-13c may be derived for the residual field aberrations remaining in spectrograph 30 which are minimized using a non-linear least square equation solver where the aspheric coefficients $a_{pl1}$, $a_{pl2}$, and $a_2$ are set as variables, refer to equations 14, 16, and 9a respectively. The equations for axial SII and SIII correction per equations 5 and 12 respectively are used to further constrain the refinement. Once approximate design parameters are determined, a ray tracing program, such as ZEMAX optical system design software, is used to further optimize the design.

Figure 3:
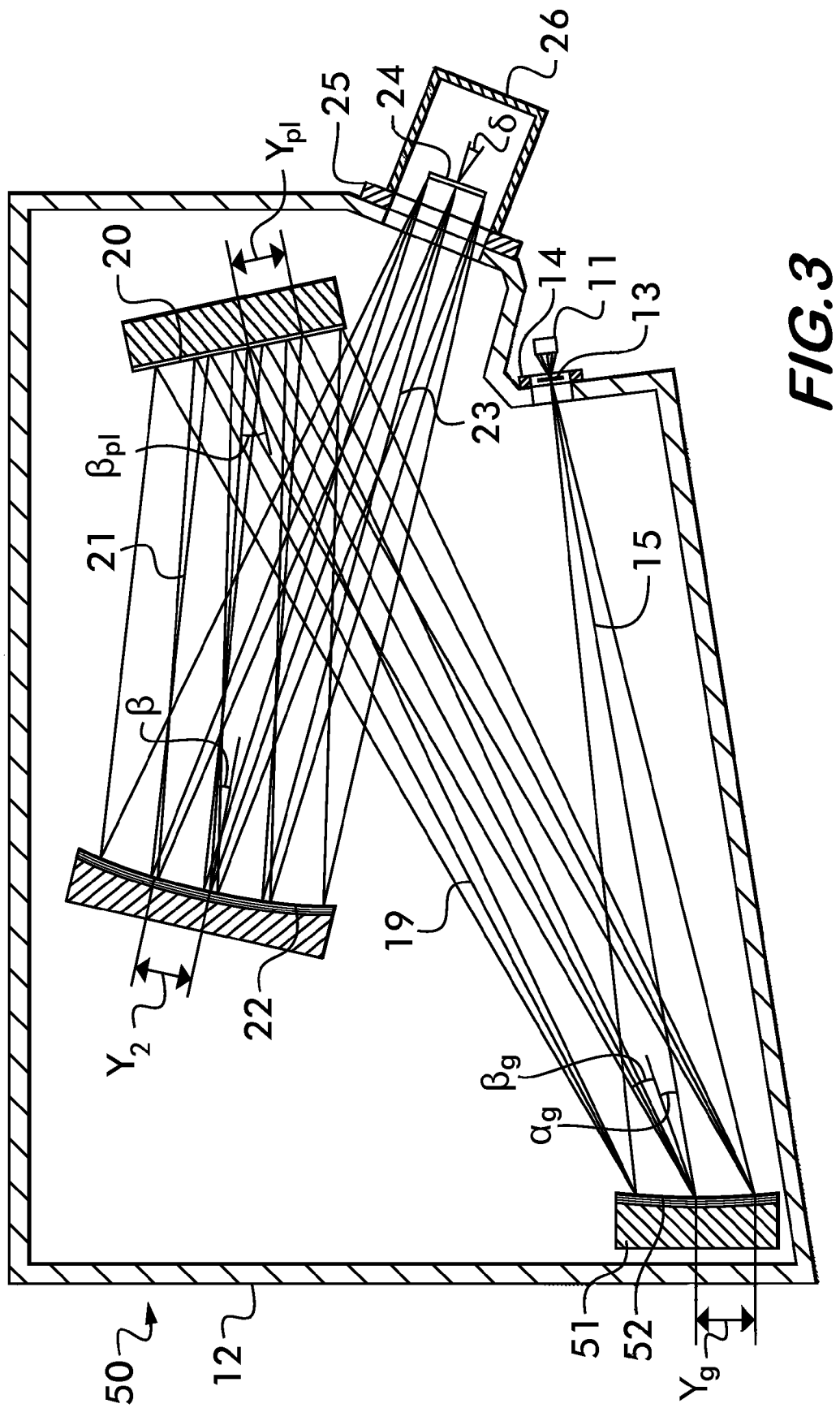
FIG. 3 is a diagrammatic view of a third embodiment of a spectrograph.

Referring to FIG. 3, a third embodiment of a spectrograph is indicated generally by the reference numeral 50. The spectrograph 50 is used in the spectral analysis of light from a source point of light 11. The source point may consist of many source points located at the slit plane 13 and may be in the form of single or multiple fiber optic sources spatially separated vertically along the axis of the slit plane. In place of a physical light source placed at the slit plane, an image from a microscope or any imaging forming instrument may be projected onto the slit plane. The spectrograph includes a housing 12 with light entrance assembly 14 that may be in the form of a pair of entrance slits, an open aperture, or the end of a fiber optic bundle itself. Light from source point 11 enters the housing as a divergent entry beam 15 and propagates towards a concave toroidal shaped diffraction grating 51. The diffraction grating 51 has a toroidal surface having evenly spaced grooves 52 that are parallel to one another and the sagittal or vertical axis of the spectrograph. Divergent beam 15 strikes the grating with an angle of incidence (AOI) $\alpha_g$ and is diffracted as dispersed beam 19, having angle of existence (AOE) $\beta_g$, refer to FIG. 3. Dispersed beam 19 now has certain amounts of $(SI)_g$, $(SII)_g$, and $(SIII)_g$ given respectively from equations 6a, 6b, and 6c within the approximation that the toroidal grating 51 is spherical having a radius equal to the design toroid's tangential radius. As used herein, the subscript 'g' on any Seidel coefficient refers to toroidal diffraction grating 51. The aberrations produced by toroidal grating 51 in spectrograph 50 are present in the exactly the same spirit as toroidal collimating mirror 16 in spectrograph 10 and are given identically by equations 6a-6c with the exception that $\alpha = \alpha_g$ referring to FIGS. 1 and 3. These aberrations will add algebraically to like aberrations as the light beam reflects from the remaining surfaces in spectrograph 50.

Diffraction grating 51 is ideally a concave toroidal holographically recorded diffraction grating having equidistant grooves. Alternatively, diffraction grating 51 may be a concave spherical grating having non-uniformly spaced grooves, as described in commonly-assigned U.S. Pat. No. 3,628,849. Gratings of this type have the ability to add controlled amounts of SIII into the diffracted beam by varying the uniformity of its groove structure. As such, a grating of this type used in the present invention would eliminate the need for grating 51 to be toroidal in shape while still permitting the necessary SIII correction.

Dispersed beam 19 is diffracted from the grating 51 towards aspheric aberration corrector plate 20. Corrector plate 20 has a surface that is rotationally symmetric and a surface sag or departure from a plano surface that is given by equation 7, wherein the subscripts, pl, refer the corrector plate 20.

The aspheric corrector plate 20 is arranged to accept light from the diffraction grating with an AOI given by $\beta_{pl}$ and introduces aberrations into reflected beam 21 that are given by the series of equations listed as equations 8a-8c where n and n' refer to the refractive index of the medium containing light paths 19 and 21 respectively, refer to FIG. 3. In the case that there is an air interface, n=−n'.

Light path 21 is incident onto aspheric concave focusing mirror 22 at an AOI given by β, refer to FIG. 3. The surface sag on focusing mirror 22 is given by equation 9a where y is the radial distance measured from apex to edge and the mirror's curvature c being related to its radius of curvature R by equation 9b. The coefficient $a_2$ in 9a gives the amount of aspheric departure focusing mirror 22 will have.

Light path 21 is reflected as converging beam 23 at an AOE given by β, referring to FIG. 3, having aberrations of the form $(SI)_2$, $(SII)_2$, and $(SIII)_2$ given respectively from equations 1, 3 and 4 where the subscript 2 on any Seidel coefficient herein refers to aspheric focusing mirror 22. Because mirror 22 is aspheric it will have additional aberration coefficients added from the presence of the aspheric contribution to its surface. The resultant Seidel aberration coefficients for mirror 22 are given as the series of equations 10a-10d.

After reflection from aspheric focusing mirror 22, convergent beam 23 forms anastigmatic images of dispersed source points 11 onto a focal plane array sensor 24. The focal plane array detector 24 may be situated at an angle given by δ and located inside a housing 26, referring to FIG. 3. For the purpose of this description, the term "anastigmatic" refers to the condition of an optical system in which images are produced free from axial and field aberrations of the form given by SI, SII and SIII Seidel coefficients at the optimized design wavelength. That is, any source point located at the slit plane is imaged to the focal plane array detector 24 with negligible image aberration.

In the embodiment shown in FIG. 3, the total of each Seidel aberration are given in the same spirit as described by equations 11a-11c. Axial SII correction is achieved in the same spirit as given by equations 12a and 12b with the exception that $\alpha=\alpha_g$ referring to FIGS. 1 and 3. Axial SIII is compensated for by altering the sagittal radius of the toroidal grating 51 for a particular grating angle which brings the longitudinally separated tangential and sagittal foci together at the axial image point as given by equations 5a-5c.

Field SIII is corrected in spectrograph 50 at one design grating angle by forcing $(SIII)_1$ in equation 11c to zero to correct choice of sagittal radius on toroidal grating 51. Field $(SIII)_2$ from the spherical contribution of focusing mirror 22 is made exactly zero by setting the stop distance equal to the mirror's radius of curvature, $s_2=R_2$, refer to FIG. 3. This leaves only the aspheric contributions from the corrector plate 20 and focusing mirror 22, remaining as a contributing terms to the total field SIII aberration in spectrograph 50.

A series of equations similar in spirit to equations 13a-13c may be derived for the residual field aberrations remaining in spectrograph 50 which are minimized using a non-linear least square equation solver where the aspheric coefficients $a_{pl}$, and $a_2$ are set as variables, refer to equations 7, and 9a respectively. The equations for axial SII and SIII correction per equations 5 and 12 respectively are used to further constrain the refinement. Once approximate design parameters are determined, a ray tracing program, such as ZEMAX optical system design software, is used to further optimize the design.

Figure 4:
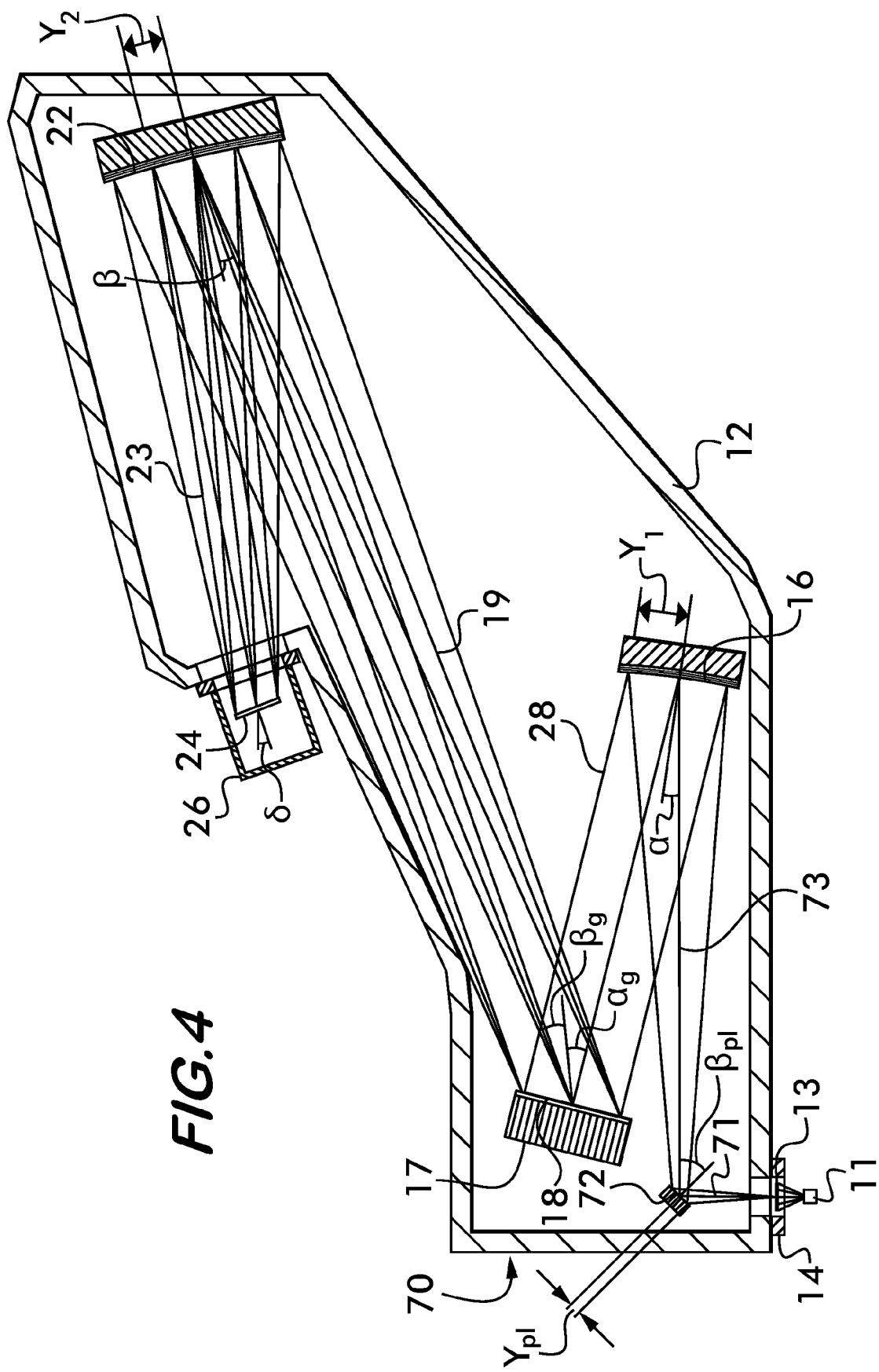
FIG. 4 is a diagrammatic view of a fourth embodiment of a spectrograph.

Referring to FIG. 4, a fourth embodiment of a spectrograph is indicated generally by the reference numeral 70. The spectrograph 70 is used in the spectral analysis of light from a source point of light 11. The source point may consist of many source points located at the slit plane 13 and may be in the form of single or multiple fiber optic sources spatially separated vertically along the axis of the slit plane. In place of a physical light source placed at the slit plane, an image from a microscope or any imaging forming instrument may be projected onto the slit plane.

The spectrograph includes a housing 12 with light entrance assembly 14 that may be in the form of a pair of entrance slits, an open aperture, or the end of a fiber optic bundle itself. Light from source point 11 enters the housing as a divergent entry beam 71 and propagates towards a aspheric aberration corrector plate 72. Corrector plate 72 has a surface that is rotationally symmetric and a surface sag or departure from a plano surface that is given by equation 7, wherein the subscripts, pl, refer to corrector plate 72.

The aspheric corrector plate 72 is arranged to direct light towards collimating mirror 16 and introduces aberrations into reflected beam 73 that are given identically by the series of equations listed as equations 8a-8c with the exception that the stop distance $s_{pl}$ and aspheric coefficient $a_{pl}$ are unique to corrector plate 72. The stop distance $s_{pl}$ for a corrector plate located in a divergent beam is given by its virtual image distance as seen by the collimating mirror 16. This is given as equation 15 where $f_1$ and g are the effective focal length of mirror 16 and the distance from light entrance assembly 14 to corrector plate 72 respectively.

Light reflected from corrector plate 72 is directed towards concave toroidal shaped collimating mirror 16 having off axis angle α, referring to FIG. 2. The collimating mirror 16 reflects light as a collimated beam 28 which is directed towards a diffraction grating 17. The collimated beam 28 has certain amounts of $(SI)_1$, $(SII)_1$, and $(SIII)_1$ given respectively and identically from equations 6a, 6b, and 6c within the approximation that the toroidal mirror is spherical having a radius equal to the design toroid's tangential radius. These aberrations will add algebraically to like aberrations as the light beam reflects from the remaining surfaces in spectrograph 70.

The diffraction grating 17 has a plano surface having evenly spaced grooves 18 that are parallel to one another and the sagittal or vertical axis of the spectrograph. Collimated beam 28 strikes the grating with an angle of incidence (AOI) $\alpha_g$ and diffracted as dispersed beam 19, having angle of existence (AOE) $\beta_g$, refer to FIG. 4. Dispersed beam 19 is incident onto aspheric concave focusing mirror 22 at an AOI given by β, refer to FIG. 4. The surface sag on focusing mirror 22 is given by identically equation 9a where y is the radial distance measured from apex to edge and the mirror's curvature c being related to its radius of curvature R by equation 9b. The coefficient $a_2$ in 9a gives the amount of aspheric departure focusing mirror 22 will have. After reflection from aspheric focusing mirror 22, convergent beam 23 forms anastigmatic images of dispersed source points 11 onto a focal plane array sensor 24. The focal plane array detector 24 may be situated at an angle given by δ and located inside a housing 26, referring to FIG. 4. For the purpose of this description, the term "anastigmatic" refers to the condition of an optical system in which images are produced free from axial and field aberrations of the form given by SI, SII and SIII Seidel coefficients at the optimized design wavelength. That is, any source point located at the slit plane is imaged to the focal plane array detector 24 with negligible image aberration.

In the embodiment shown in FIG. 4, the total of each Seidel aberration are given in the same spirit as described by equations 11a-11c. Axial SII correction is achieved in the same spirit as given by equations 12a and 12b. Axial SIII is compensated for by altering the sagittal radius of the collimating mirror which brings the longitudinally separated tangential and sagittal foci together at the axial image point as given by equations 5a-5c.

Field SIII is corrected in spectrograph 70 by forcing (SIII)$_1$ in equation 11c to zero by correct choice of sagittal radius on toroidal mirror 16 and by requiring the principal ray angle in the tangential plane for all source points located at the slit plane to be equal. That is to say, because mirror 16 has its sagittal radius chosen to balance (SIR for a specific and constant design principal ray angle of α, refer to FIG. 4, field (SIII)$_1$ is by definition equal to zero. Field (SIII)$_2$ from the spherical contribution of focusing mirror 22 is made exactly zero by setting the stop distance equal to the mirror's radius of curvature, $s_2=R_2$, refer to FIG. 4. This leaves only the aspheric contributions from the corrector plate 72 and focusing mirror 22, remaining as a contributing terms to the total field SIII aberration in spectrograph 70.

A series of equations similar in spirit to equations 13a-13c may be derived for the residual field aberrations remaining in spectrograph 70 which are minimized using a non-linear least squares equation solver where the aspheric coefficients $a_{pl}$ and $a_2$ are set as variables, refer to equations 7 and 9a respectively. The equations for axial SII and SIII correction per equations 5 and 12 respectively are used to further constrain the refinement. Once approximate design parameters are determined, a ray tracing program, such as ZEMAX optical system design software, is used to further optimize the design.

As one illustrative example of suitable dimensions, a collimating mirror 16 may have tangential and sagittal radii equal to 705 mm and 682 mm respectively with an off-axis angle of α=7.0 degrees, referring to FIG. 1. An aspheric corrector plate 20 may have an aspheric coefficient $a_{pl}$=1.63E-9 and an off-axis angle of $\beta_{pl}$=15.8 degrees, referring to FIG. 1. An aspheric focusing mirror 22 may have a radius of curvature equal to 646 mm and aspheric coefficient $a_2$=1.00E-9 with an off-axis angle of β=7.5 degrees, refer to FIG. 1. The stop distance $s_2$ for mirror 22 may be equal to its radius of curvature thereby allowing complete field SIII compensation, however, a range of values giving acceptable performance while not deviating from the scope or spirit of the present invention may be determined. Exact dimensions for a specific spectrograph may be calculated using known methods in the art, including the use of commercially available ray tracing software, such as ZEMAX.

Various modifications and perturbations can be made in the present invention without departing from the scope or spirit of the invention. Therefore, it is intended that the present invention cover the modifications and perturbations of this invention provided they come within the scope of the appended claims and their equivalents.

For example, baffles may be used to restrict the diameter of light beams 15, 25, 19, 21, or 23, refer to FIGS. 1, 2, 3, and 4, in such ways as to further improve the image quality by reducing the internal f/#. Baffles may also be elsewhere inside spectrographs 10, 30, 50, and 70 in such ways as to reduce the amount of stray or unwanted light from reaching detector 24.

Figure 5:
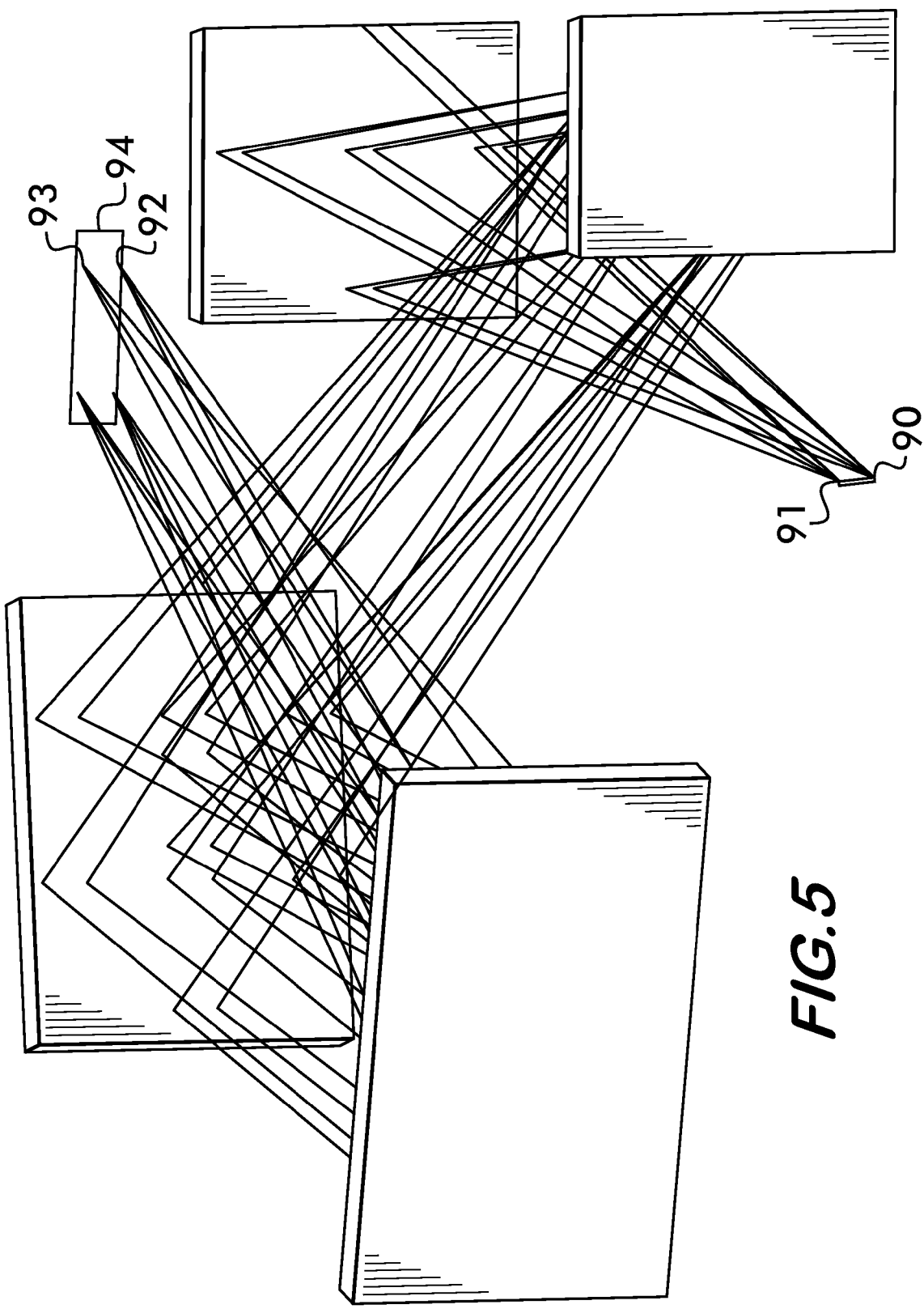
FIG. 5 is a diagrammatic view of a spectrograph embodiment for use with multiple source points.

Also, the spectrographs 10, 30, 50, and 70 are described having only a single source point 11, the spectrographs may, instead have one or more light sources distributed perpendicular to the tangential plane of the drawings in FIGS. 1, 2, 3, and 4. This is shown is FIG. 5 which depicts source points 90 and 91 that are imaged anastigmatically as image points 92 and 93 and recorded by focal plane array detector 94 which may be a CCD or PDA.

The use of an additional aspheric corrector plate 31 in spectrograph 30 as described in FIG. 2 represents a perturbation of the present invention allowing for additional compensation of aberrations. It is considered to be within the scope and spirit of the present invention to add a third or additional aspheric corrector plates to anyone of the mentioned embodiments. The aspheric corrector plates mentioned herein all refer to a fourth order deviation from a spherical surface given by equation 9a. Corrector plate 20, 32, 71, or 73 in spectrographs 10, 30, 50, and 70 need not be represented by equation 9a, rather, a freeform polynomial, given as equation 17 may be used to compensate for aberrations higher than the third order Seidel aberrations of the present invention. Referring to equation 18 the coefficients $C_{ij}$ of a freeform polynomial refer to the polynomial expansion coefficients and x, y are Cartesian coordinates in the tangential and sagittal planes respectively. The first term in equation 17 refers to the equation of a standard spherical surface and the second term represents the freeform departure.

$$z = \frac{c_2 y_2^2}{1 + \sqrt{1 - c_2^2 y_2^2}} + \sum_{i,j}^{N} C_{i,j} X^i Y^j \tag{17}$$

$$\sum_{i,j}^{N} C_{i,j} X^i Y^j = \tag{18}$$

$$C_{10} X^1 Y^0 + C_{01} X^0 Y^1 + C_{20} X^2 Y^0 + C_{11} X^1 Y^1 + - C_{i,j} X^i Y^j$$

The collimating and focusing elements of spectrographs 10, 30, 50, and 70 need not be described by toroidal and aspheric surfaces respectively; rather, they may be equally represented by equation 17 with no deviation in figure from their analytical closed form representation. Moreover, further modification of coefficients $C_{ij}$ using optical design software, such as ZEMAX, may be done to reduce aberrations of higher than third order. This would result in a useful gain in imaging performance at the expense of manufacturing cost of each freeform mirror.

While the invention has been described in detail and with reference to specific examples thereof, it will be apparent to one skilled in the art that various changes and modifications can be made therein without departing from the spirit and scope thereof.

I claim:

1. A spectrograph comprising:
   a housing having a light entrance assembly for receiving an incoming beam of light from a source point of light;
   A focal plane array detector;
   at least one optical element having a collimating portion arranged for collimating said incoming beam of light to produce a collimated beam, and a dispersing portion for dispersing said collimated beam of light into a dispersed light beam comprising a plurality of wavelengths;
   a focusing optical element having a concave surface arranged for focusing said dispersed light beam onto said focal plane array detector,
   wherein said focusing optical element has a radius of curvature and is located a distance equal to said radius of curvature from said dispersing portion, and
   wherein said focusing optical element comprises an aspheric departure from said concave surface adapted to add or subtract aberrations; and
   at least one aberration-correcting element positioned within said housing for receiving and reflecting light, wherein said aberration correcting element includes an aspheric surface adapted to add or subtract aberrations.

2. The spectrograph of claim 1, wherein said collimating portion of said at least one optical element comprises:
   a toroidal collimating minor for collimating said incoming beam of light into said collimated beam, a separate plano-dispersive element adapted to disperse said collimated beam into said dispersed light beam comprising a plurality of wavelengths, wherein said at least one aberration-correcting element includes a corrector plate situated between said plano-dispersive element and said focusing element.

3. The spectrograph of claim 2, further comprising a second aberration correcting element in an optical path between said source point of light and said toroidal collimating minor.

4. The spectrograph of claim 2, wherein said focusing element has an aspheric departure represented by a fourth order polynomial in radial coordinates to produce aberrations comprising third order Seidel aberrations represented by Seidel coefficients SI, SII, and SIII.

5. The spectrograph of claim 2, wherein said focusing element has an aspheric departure represented by a freeform polynomial in the Cartesian 'x' and 'y' coordinates of polynomial order greater than zero to produce first order and higher aberrations.

6. The spectrograph of claim 1, wherein said aspheric surface is represented by a fourth order polynomial in radial coordinates to produced third order Seidel aberrations represented by Seidel coefficients SI, SII, and SIII.

7. The spectrograph of claim 3, wherein said second aberration correcting element is represented by a freeform polynomial in the Cartesian 'x' and 'y' coordinates of polynomial order greater than zero to produce first order and higher aberrations.

8. The spectrograph of claim 1, wherein said at least one optical element includes a concave diffraction grating adapted to collimate and disperse said divergent beam of light; and wherein said at least one aberration correcting element includes a corrector plate that is situated between said concave grating and said focusing element.

9. The spectrograph of claim 7, wherein said concave grating comprises non-uniformly spaced grooves adapted to add positive or negative SIII aberration to said dispersed light beam.

10. A spectrograph for converting an incoming beam of light into a dispersed beam of light comprising:

an optical element adapted for collimating the incoming beam of light into a collimated beam of light;

a dispersing element adapted for converting said collimated beam of light into a dispersed beam of light comprising a plurality of wavelengths;

a focusing element adapted for focusing said dispersed beam of light onto a focal plane; and a first aberration correcting element;

wherein said focusing element has a radius of curvature and is located a distance equal to said radius of curvature from said dispersing element; and wherein said focusing element comprises an aspheric departure from said concave surface, said aspheric departure being adapted to add or subtract aberrations; and wherein said aberration correcting element is in an optical path between said incoming beam of light and said focusing element.

11. The spectrograph of claim 10 further comprising a second aberration correcting element.

12. The spectrograph of claim 10, wherein said dispersing element is located on a surface of said collimating element to form a dispersing and collimating element.

13. The spectrograph of claim 10, wherein said incoming beam of light is first directed to said first aberration correcting element and from said aberration correcting element to said to said collimating element, said collimated beam is directed to said dispersing element and said dispersed beams are directed to said focusing element.

14. The spectrograph of claim 12, wherein said incoming beam of light is first directed to said combined dispersing and collimating element to form collimated and dispersed beams of light and said collimated and dispersed beams of light are directed to said first aberration correcting element and then to said focusing element.

15. The spectrograph of claim 10, wherein said incoming beam of light is first directed to a second aberration correcting element and then to said collimating element, said collimated beam of light is directed to said dispersing element, said dispersed beams of light are directed to said first aberration correcting element and then to said focusing element.

* * * * *